United States Patent
Zhang et al.

(10) Patent No.: US 7,509,544 B2
(45) Date of Patent: Mar. 24, 2009

(54) DATA REPAIR AND SYNCHRONIZATION METHOD OF DUAL FLASH READ ONLY MEMORY

(75) Inventors: Nan Zhang, Tianjin (CN); Yan-Peng Yang, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 277 days.

(21) Appl. No.: 11/710,694

(22) Filed: Feb. 26, 2007

(65) Prior Publication Data

US 2008/0209261 A1    Aug. 28, 2008

(51) Int. Cl.
G11C 29/00    (2006.01)
G06F 11/00    (2006.01)
(52) U.S. Cl. .................... 714/710; 714/12
(58) Field of Classification Search .......... 714/710, 714/764, 6, 11, 12, 36; 713/2; 710/107, 710/100
See application file for complete search history.

(56) References Cited

U.S. PATENT DOCUMENTS

| | | | |
|---|---|---|---|
| 5,388,267 A * | 2/1995 | Chan et al. ............ | 713/2 |
| 5,793,943 A * | 8/1998 | Noll ..................... | 714/6 |
| 5,870,520 A * | 2/1999 | Lee et al. ............. | 714/6 |
| 6,079,016 A * | 6/2000 | Park .................... | 713/2 |
| 6,233,681 B1 * | 5/2001 | Kang ................... | 713/2 |
| 6,374,318 B1 * | 4/2002 | Hayes et al. ......... | 710/107 |
| 6,675,275 B2 * | 1/2004 | Nimura et al. ....... | 711/170 |

* cited by examiner

*Primary Examiner*—Phung M Chung
(74) *Attorney, Agent, or Firm*—Morris Manning Martin LLP; Tim Tingkang Xia, Esq.

(57) ABSTRACT

A data repair and synchronization method of dual flash ROM is provided, which includes a first flash ROM and a second flash ROM that store the same system data, wherein one of the first flash ROM and the second flash ROM is used to perform a data repair on the other flash ROM with damaged data and perform a data synchronization between the two flash ROMs, thereby ensuring that once the data in one flash ROM is damaged during the system operation, the complete system data stored in the other flash ROM is used to recover the damaged operating system and the files in the system. Meanwhile, through performing the data synchronization periodically, important configuration files in the system stored in the two flash ROMs are kept to be updated and completed.

12 Claims, 4 Drawing Sheets

DATA REPAIR AND SYNCHRONIZATION METHOD OF DUAL FLASH READ ONLY MEMORY

BACKGROUND OF THE INVENTION

1. Field of Invention

The present invention relates to a data repair and synchronization method for a computer system and system files, and more particularly, to a method for performing a data repair and synchronization on a computer system and system files through dual flash read only memory (ROM) architecture.

2. Related Art

Nowadays, people are lived in an information era where information exists everywhere, and Internet, E-mail, and continuously emerged new applications all make people be highly dependent on the information. The development of enterprises depends on the complete and accurate information, and thus, the protection of the enterprise information is critical to the survival and development of the enterprise.

With regard to the importance of the information, many methods or strategies for backup and recovery of the information have been provided in the conventional art, for example, the redundancy strategy of hardware products, fix-point backup strategy, and remote backup strategy, etc. But these techniques are generally used for the backup and recovery of the data that have been stored by the user. Moreover, other important information, for example, the operating system and some configuration files stored in the system, are used for managing the information such as the data stored by the user, and thus, the backup and recovery of the information is necessary.

Generally, the information of the enterprise is stored on a dedicated server. As for a dedicated server, the information, such as the user's data, is stored on a storage device, and the operating system and many important configuration files are individually stored on a disk called flash ROM. On one hand, when the system is booted, the operating system stored on the flash ROM needs to be loaded into the internal memory for being booted. On the other hand, during the system operation, the data on the flash ROM needs to be read and written. Once the flash ROM is damaged, the user will lose some important data. Even worse, if the operating system stored on the flash ROM is damaged, the whole system cannot be booted, and all the data on the flash ROM will be lost. Once such information is lost, other users' information that has been stored will be also damaged.

Some conventional arts are also related to the recovering of the operating system. For example, the Linux system (a free multi-user computer operating system operated on common personal computers) has a tool called Linuxcare bootable business card (BBC for short) in the tool box, which is provided for being used by experienced Linux system administrators to recover the damaged Linux system. The BBC is used for re-establishing a complete and operatable system environment for the user to recover the damaged operating system. However, BBC technique only can be used for recovering the damaged system, but cannot recover the damaged files in the system.

Based on the above, the problems in the above conventional art lie in that, when the flash ROM is damaged or the data stored therein is damaged:

1. the data repair is not performed automatically, but achieved by experienced system administrators through using a specialized software repair tool;

2. if the operating system and the configuration files in the system are all damaged, only the operating system can be recovered, but the files in the system cannot be recovered; and 3. if the hardware of the flash ROM is damaged, it is necessary to replace it with a completely new flash ROM, and thus, the data in the original flash ROM may be totally lost.

SUMMARY OF THE INVENTION

In order to solve the above problems and defects in the conventional art, the present invention is directed to a data repair and synchronization method of dual flash ROM, which is achieved by fixing a first flash ROM onto a motherboard of a server in advance and connecting a second flash ROM to the motherboard of the server in a pluggable way, and then, using one of the first flash ROM and the second flash ROM that store the same system data to perform a data repair on the other flash ROM with damaged data, and then performing data synchronization between the two flash ROMs.

The data repair and synchronization method of dual flash ROM provided by the present invention comprises the following steps:

booting the system and setting the next system-booting position stored in the system BIOS as the first flash ROM before the system BIOS passes the control right to the operating system; determining whether the second flash ROM is normally booted or not, and if yes, the data of the second flash ROM does not need a repair, and booting the operating system from the second flash ROM, otherwise, booting the operating system from the first flash ROM; wherein when the operating system is booted from the first flash ROM, it further comprises the following steps: (a) determining whether the value of the data repair times of the second flash ROM is larger than a predetermined maximum value or not, and if it is larger than the predetermined maximum value, ending the data repair; if it is smaller than or equal to the predetermined maximum value, using the data of the first flash ROM to perform a data repair on the second flash ROM, and then executing Step (b); (b) adding the data repair times of the second flash ROM by 1; and (c) changing the next system-booting position as the second flash ROM, and then re-booting the system.

Moreover, in the data repair and synchronization method of dual flash ROM, when the operating system is booted from the second flash ROM, it further comprises the following steps: (a") returning the data repair times of the second flash ROM to zero; (b") determining whether the data of the first flash ROM needs a repair or not, if yes, using the data of the second flash ROM to perform a data repair on the first flash ROM, and then executing Step (c"); otherwise, executing Step (c") directly; and (c") setting the next system-booting position as the second flash ROM, and then ending the data repair.

Moreover, in the data repair and synchronization method of dual flash ROM provided by the present invention, when it is determined that the data of both the first and second flash ROMs do not need a repair or have already been repaired, a step of performing data synchronization between the first flash ROM and the second flash ROM is further included, which comprises the following detailed steps: comparing time stamps of the system configuration files stored in the first and second flash ROMs; and when the system is booted, or after the system has been operated for a period of time, or before the system is shut up or re-booted, copying the system configuration files with the latest time stamp in the first or second flash ROM into the other flash ROM for performing the data synchronization.

Based on the above, compared with the conventional art, the present invention has the following advantages.

1. Through using the method of the present invention, once it is found that the system data of one flash ROM is damaged during the booting or operating process of the computer system, a data recovery process is automatically performed on the damaged operating system and files in the system through the other flash ROM with complete system data, so as to perform a quick and complete repair on the damaged operating system and system files are repaired, and thus it is quite convenient for the system administrator to perform maintenance on the system data. Moreover, since the single flash ROM has a lower price, the dual flash ROM architecture adopted in the method of the present invention has no great influence on the overall cost of the system.

2. Through using the method of the present invention, the data synchronization is periodically performed, such that the important system configuration files stored in the two flash ROMs are maintained to be updated and completed.

3. Even if the hardware of one of the two flash ROMs is damaged and cannot be repaired, it is convenient for the user to replace the damaged flash ROM with a complete new flash ROM, and after the operating system is booted, all the system data in the other undamaged flash ROM is copied to the new flash ROM, so as to eliminate the defect in the conventional art that once the hardware of the flash ROM is damaged, the data stored therein may be totally lost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

The detailed illustration on the preferred embodiment of the present invention will be given hereinafter with reference to the drawings.

Figure 1A:
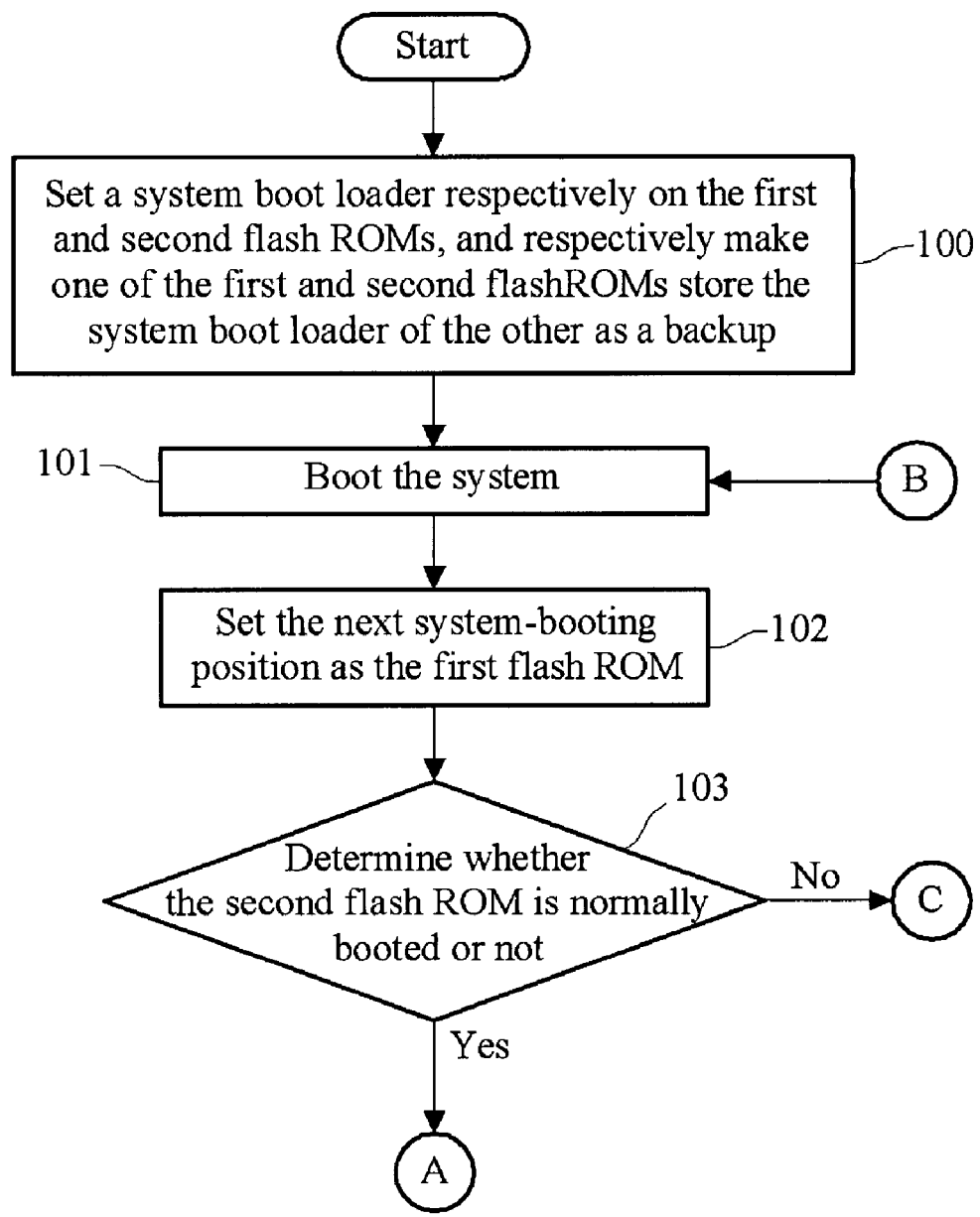
FIG. 1A is a flow chart of a data repair and synchronization method of dual flash ROM according to a preferred embodiment of the present invention.
Figure 1B:
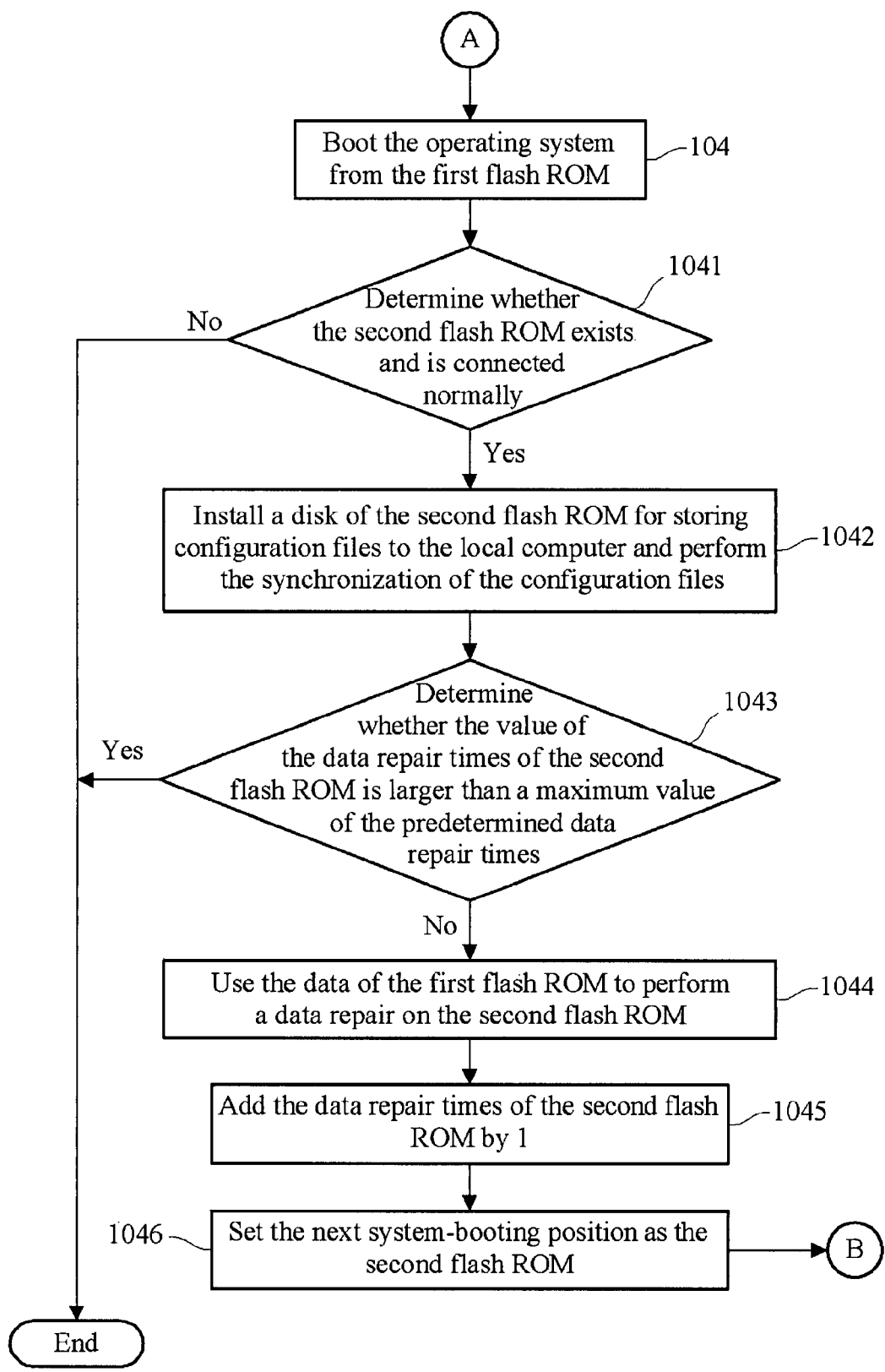
FIG. 1B is a flow chart continuing FIG. 1A.
Figure 1C:
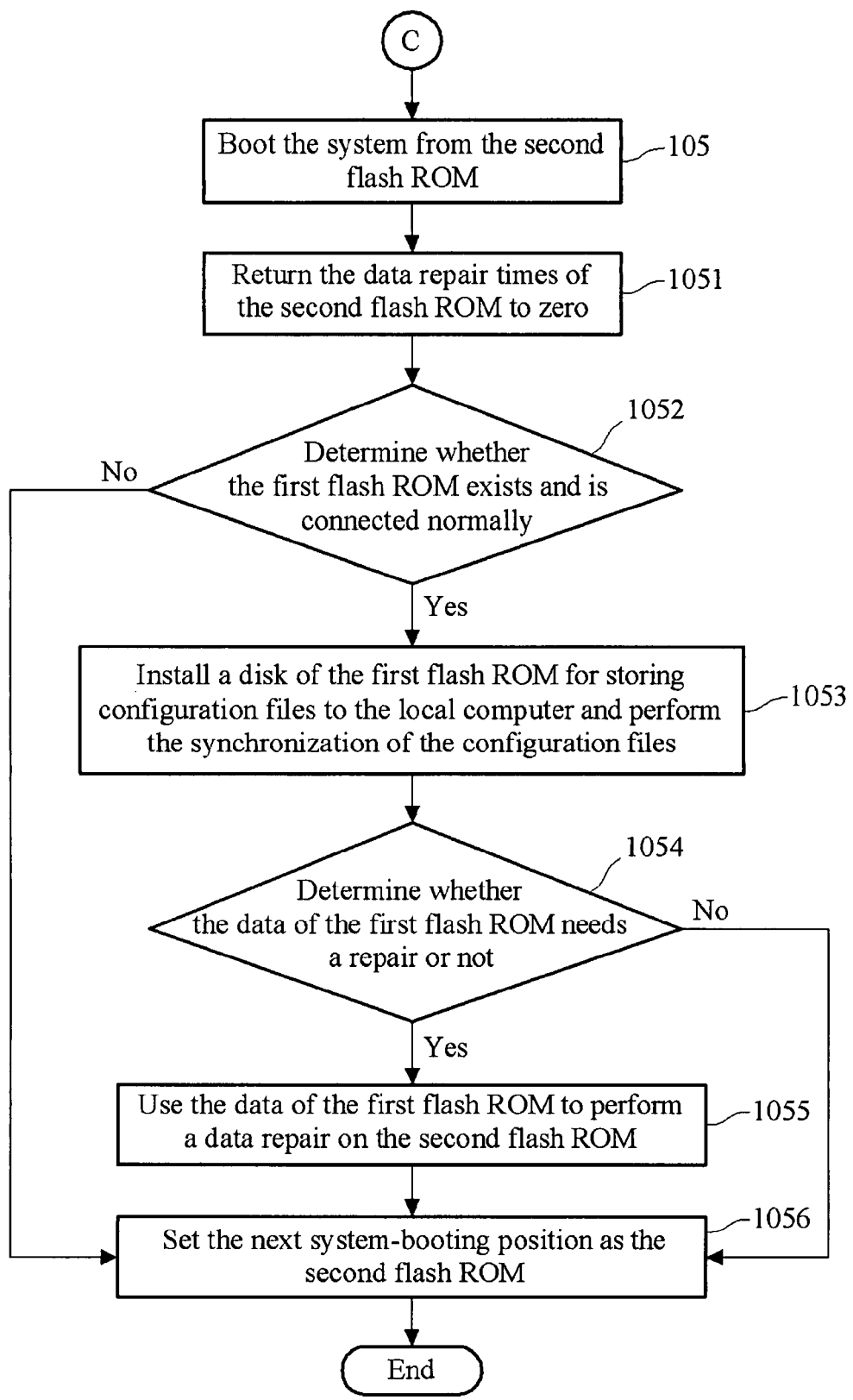
FIG. 1C is flow chart continuing FIG. 1A.

FIGS. 1A through 1C are flow charts of a data repair and synchronization method of dual flash ROM according to a preferred embodiment of the present invention. The data repair and synchronization method of dual flash ROM of the present invention includes fixing a first flash ROM onto a motherboard of a server in advance and connecting a second flash ROM to the motherboard of the server in a pluggable way, and then using one of the first flash ROM and the second flash ROM that store the same system data to perform a data repair on the other flash ROM with damaged data, and then, performing a data synchronization between the two flash ROMs. As shown in FIGS. 1A, 1B and 1C, the data repair and synchronization method of dual flash ROM includes the following steps:

setting a system boot loader (with the English name as "boot loader", which is mainly used for leading, loading, and booting the operating system, and the system boot loader adopted by the present invention herein is GRUB with the full English name as "grand unified boot loader", which is used for leading various operating systems) respectively on the first and second flash ROMs in advance, and respectively making one of the first and second flash ROMs store the system boot loader of the other as a backup (Step 100);

booting the system (Step 101), and before the system BIOS (basic input output system, used for achieving the initiation of the system hardware and relevant configurations) passes the control right to the operating system, setting the next system-booting position stored in the system BIOS as the first flash ROM through the system boot loader of the second flash ROM (Step 102);

checking and determining whether the second flash ROM is normally booted or not through the system boot loader of the second flash ROM (Step 103), and if it cannot be normally booted, it indicates that the data of the second flash ROM needs a repair, and thus, the operating system is booted from the first flash ROM (Step 104 in FIG. 1B), and if it can be normally booted, it indicates that the data of the second flash ROM does not need a repair, and thus the operating system is booted from the second flash ROM (Step 105 in FIG. 1C), wherein the step of further determining whether the data of the second flash ROM needs a repair or not is achieved by calculating and comparing a check value (MD 5 SUM VALUE, wherein the full English name of MD5 is "message-digest algorithm 5", which is an iterative encryption hash function used for computer information verification, and the calculating method of the MD5 SUM VALUE of the system data is well known by persons skilled in the art, which thus will not be described herein in detail) of the system data on the second flash ROM, and if the obtained MD5 SUM VALUE is the same as the MD5 SUM VALUE of the system data stored on the second flash ROM during the system compiling, the data of the second flash ROM is complete and does not need a repair; otherwise, the data of the second flash ROM is damaged and needs a repair;

wherein when the operating system is booted from the first flash ROM, it further includes the following steps:

determining whether the second flash ROM exists and is normally connected (Step 1041), and if yes, installing a disk of the second flash ROM for storing configuration files to the local computer, and performing the synchronization of the configuration files to ensure the configuration files stored in the system to be latest (Step 1042); otherwise, ending the data repair;

determining whether the value of the data repair times of the second flash ROM is larger than a maximum value of the predetermined data repair times (Step 1043), wherein the value of the repair times of the second flash ROM is stored in a configuration file and it can be obtained and modified through the configuration file, and the maximum value of the predetermined data repair times has no fixed standard, which is generally set as 3 to 5 according to the actual requirement of the user and unnecessary to be larger;

if the value of the data repair times is smaller than or equal to the maximum value, using the data of the first flash ROM to perform a data repair on the second flash ROM (Step 1044), and executing Step 1045 after the repair; if the data repair times is larger than the maximum value, ending the data repair (at this time, it is considered that the data in the second flash ROM is damaged and cannot be repaired, i.e., the hardware of the second flash ROM is damaged, and thus the data repair is ended and only the first flash ROM can be used for booting, definitely, the user also can select a new second flash ROM to replace the damaged second flash ROM, but the repair times of the second flash ROM recorded in the system should be returned to zero before the replacement, and then after the replacement, the system copies all the system data in the first flash ROM into the new second flash ROM);

adding the data repair times of the second flash ROM by 1 (Step 1045); and changing the next system-booting position as the second flash ROM (Step 1046), and then re-booting the system (returning to Step 101 in FIG. 1A and successively executing the subsequent steps, so as to check and determine whether the data repair of the second flash ROM is successful or not according to the boot position of the operating system, if the data repair is not successful, a data repair is performed once again on the second flash ROM within the range of the predetermined allowable maximum data repair times); and wherein when the operating system is booted from the second flash ROM, it further includes the following steps:

returning the data repair times of the second flash ROM to zero (Step 1051);

determining whether the first flash ROM exists and is connected normally (Step 1052), if yes, installing a disk of the first flash ROM for storing configuration files to the local computer, and performing the synchronization of the configuration files (Step 1053), and otherwise, executing Step 1056.

determining whether the data of the first flash ROM needs a repair or not (Step 1054), if yes, using the data of the second flash ROM to perform a data repair on the first flash ROM (Step 1055), then executing Step 1056; and otherwise, directly executing Step 1056, wherein the process of determining whether the data of the first flash ROM needs a repair or not is the same as that of determining whether the second flash ROM needs a repair, which thus will not be described herein in detail; and setting the next system-booting position as the second flash ROM (Step 1056), and then ending the data repair.

Figure 2:
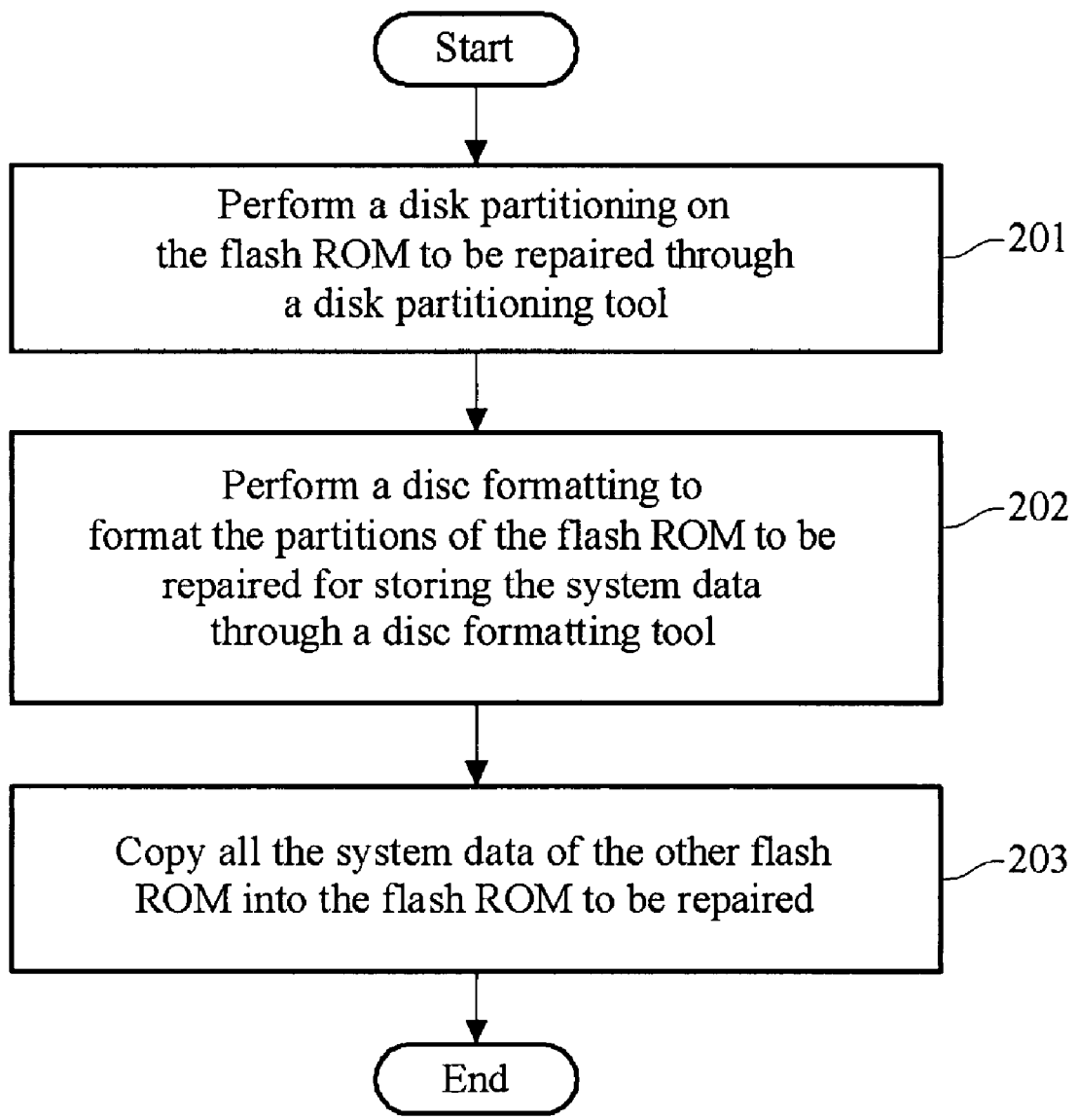
FIG. 2 is a flow chart of a data repair process in the data repair and synchronization method of dual flash ROM according to the present invention.

FIG. 2 is flow chart of a data repair process in the data repair and synchronization method of dual flash ROM according to the present invention. As shown in FIG. 2, in the data repair and synchronization method of dual flash ROM, the step of using the data of one flash ROM to perform a data repair on the other flash ROM (Steps 1044 and 1054) further includes the following detailed steps:

performing a disk partitioning on the flash ROM to be repaired through a disk partitioning tool (e.g., Fdisk, which is a disk partitioning tool commonly used by persons skilled in the art) (Step 201);

performing a disc formatting to format the partitions of the flash ROM to be repaired for storing the system data through a disc formatting tool (e.g., Makefs, which is a disk formatting tool commonly used by persons skilled in the art) (Step 202); and copying all the system data of the other flash ROM into the flash ROM to be repaired (Step 203).

Moreover, the data repair and synchronization method of dual flash ROM further includes a step of data synchronization as follows (not shown in the figure):

if the data of the first and second flash ROMs does not need a repair or has already been repaired, comparing time stamps of the system configuration files stored in the first and second flash ROMs (the time stamp refers to the time recorded when the configuration file is amended for the last time, and the configuration file with the time stamp recorded at a relative late time point in the two configuration files is the latest one); then, when the system is booted or after the system has been operated for a period of time or before the system is shut up or re-booted, copying the system configuration files with the latest time stamp in the first or second flash ROM into the other flash ROM for performing the data synchronization, so as to keep the time stamps of the important system configuration files stored in the first and second flash ROMs to be latest and the content to be complete.

Moreover, the data repair and synchronization method of dual flash ROM further includes a step of determining the correct booting position through the system-booting position recorded in the system file (a system file under the directory of proc:/proc/cmdline) after the operating system is normally booted (i.e., determining the operating system is booted from the first flash ROM or the second flash ROM) (not shown in the figure).

In view of the above, the following factors should be noted in the present invention.

One objective of adding a second flash ROM in the method of the present invention lies in that, the second flash ROM and the first flash ROM respectively act as the backup for each other. Once the system data in one flash ROM is damaged and thus the operating system cannot be normally booted, the other flash ROM is used for booting the operating system. When the operating system is normally operated, the complete system data can be used to repair the damaged system data, so as to recover the damaged operating system and system files.

Another objective of adding the second flash ROM in the method of the present invention lies in ensuring the system data in the first flash ROM not to be damaged. Once the system is booted, the system data (including the data of the operating system and the configuration files of the system) stored on the first and second flash ROMs are totally identical, thus it means all the same for the users to boot the operating system from any one of the flash ROMs. However, in the method of the present invention, when the data in both the flash ROMs are normal, the system is fixedly booted from the second flash ROM, and the first flash ROM is used as the backup of the second flash ROM for repairing the damaged data in the second flash ROM. Only when the system data of the second flash ROM for booting the operating system is damaged, the operating system is booted from the first flash ROM used as a backup. The objective lies in that, since the booting times of the first flash ROM used for backup and repairing the damaged data is far less than that of the second flash ROM, the chance for damaging the data is very slim, and thus the system data in the first flash ROM is effectively prevented from being damaged, and even it is considered that the system data in the first flash ROM will not be damaged for ever.

As for the second flash ROM, if a problem occurs to the system data, and thus the operating system cannot be normally booted, the system is booted from the first flash ROM, and after the system is normally booted, the data of the first flash ROM is used to repair the data of second flash ROM. After the data repair is successful, when the system is booted for the next time, the operating system is booted from the second flash ROM again. Thus, once the system is booted, the next system-booting position is changed as the first flash ROM. Therefore, if the system cannot be booted from the second flash ROM, when the system is re-booted, the system is booted from the first flash ROM. If the data on the second flash ROM is damaged, after the system is normally booted from the first flash ROM, the complete data in the first flash ROM is used to repair the damaged data on the second flash ROM. After the data repair is finished, it should further validate whether the damaged data on the second flash ROM is successfully repaired or not. The validation process is to consider whether the operating system can be normally booted from the second flash ROM or not. Therefore, after the data repair is finished, the next system-booting position needs to be changed as the second flash ROM, and then the system is re-booted. If the system is successfully booted, it indicates that the data repair is successful. If the system is not successfully booted, the system data on the second flash ROM needs to be repaired once again. If the value of data repair times is not larger than the maximum value of the predetermined repair times, if the data repair is not successful, the data repair can be performed once again. If the value of the data repair times exceeds the maximum value, the data repair is no longer performed, and the user can select to replace the hardware of the second flash ROM.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data repair and synchronization method of dual flash read only memory (ROM), which is achieved by fixing a first flash ROM onto a motherboard of a server in advance and connecting a second flash ROM to the motherboard of the server in a pluggable way, and then, using one of the first flash ROM and the second flash ROM that store same system data to perform a data repair on the first flash ROM or the second flash ROM with damaged data and performing a data synchronization between the two flash ROMs, the method comprising:

booting a system with the second flash ROM, and setting a next system-booting position stored in a system BIOS as the first flash ROM;
 re-booting the system with the first flash ROM when it is determined that data in the second flash ROM needs to be repaired, and further comprising following steps:
 (a) upon determining that a value of data repair times of the second flash ROM is no larger than a predetermined maximum value, using the data of the first flash ROM to perform the data repair on the second flash ROM;
 (b) adding the data repair times of the second flash ROM by 1; and
 (c) changing the next system-booting position as the second flash ROM, and then, re-booting the system; and
 upon determining that the data of the first flash ROM and the second flash ROMs do not need a repair or already recovered, performing the data synchronization between the first flash ROM and the second flash ROM.

2. The data repair and synchronization method of dual flash ROM as claimed in claim 1, wherein upon determining that the data of the second flash ROM does not need the data repair, the system is booted from the second flash ROM, and further comprising following steps:

(a") returning the data repair times of the second flash ROM to zero;
 (b") determining whether the data of the first flash ROM needs the data repair or not, and if yes, using the data of the second flash ROM to perform the data repair on the first flash ROM, and then executing Step (c"), otherwise, executing Step (c") directly; and
 (c") still setting the next system-booting position as the second flash ROM, and then ending the data repair.

3. The data repair and synchronization method of dual flash ROM as claimed in claim 2, wherein Step (b") further comprises:

determining whether the first flash ROM exists and is connected normally, and if yes, installing a disk of the first flash ROM for storing configuration files to a local computer, and performing synchronization of the configuration files; if not, executing Step (c").

4. The data repair and synchronization method of dual flash ROM as claimed in claim 2, wherein the step of determining whether the data of the first flash ROM or the second flash ROM needs the data repair or not is performed by calculating and comparing a check value (MD5 SUM VALUE) of the system data in the first flash ROM or the second flash ROM, and if the check value obtained through calculation is same as a check value of the system data stored in the first flash ROM or the second flash ROM during a system compiling, the data of the flash ROM is complete and does not need the data repair; otherwise, the data of the flash ROM is damaged and needs the data repair.

5. The data repair and synchronization method of dual flash ROM as claimed in claim 2, wherein the step of using the data of one flash ROM to perform the data repair on the other flash ROM further comprises:

performing a disk partitioning on the flash ROM to be repaired in a disk partition way;
 performing a disc formatting to format the partitions of the flash ROM to be repaired for storing the system data; and
 copying all the system data of the other flash ROM into the flash ROM to be repaired.

6. The data repair and synchronization method of dual flash ROM as claimed in claim 1, wherein the step of performing a data synchronization between the first flash ROM and the second flash ROM further comprises:

comparing time stamps of the configuration files stored in the first flash ROM and the second flash ROMs; and
 copying the configuration files with a latest time stamp in the first flash ROM or the second flash ROM into the second or the first flash ROM for performing the data synchronization when the system is booted or after the system has been operated for a period of time or before the system is shut up or re-booted.

7. The data repair and synchronization method of dual flash ROM as claimed in claim 6, wherein the time stamp refers to a time recorded when the configuration file is amended for a last time, and the configuration file with the time stamp recorded at a relative late time point in the two configuration files is a latest one.

8. The data repair and synchronization method of dual flash ROM as claimed in claim 1, further comprising:

setting a system boot loader on each of the first flash ROM and the second flash ROMs in advance, and respectively making one of the first flash ROM and the second flash ROMs store the system boot loader of the other as a backup.

9. The data repair and synchronization method of dual flash ROM as claimed in claim 8, further comprising using the system boot loader of the second flash ROM to set the next system-booting position stored in the system BIOS as the first flash ROM, after the system is booted and before the system BIOS passes control right to the system.

10. The data repair and synchronization method of dual flash ROM as claimed in claim 8, wherein the step of determining whether the data of the second flash ROM needs the data repair or not is achieved through the system boot loader of the second flash ROM.

11. The data repair and synchronization method of dual flash ROM as claimed in claim 1, wherein Step (a) further comprises:
   determining whether the second flash ROM exists and is connected normally, and if yes, installing a disk of the second flash ROM for storing configuration files to a local computer, and performing synchronization of the configuration files; if not, ending the data repair.

12. The data repair and synchronization method of dual flash ROM as claimed in claim 1, wherein Step (a) further comprises:
   upon determining the data repair times of the second flash ROM is larger than the maximum value, ending the data repair.

* * * * *